United States Patent
Shreve (10) Patent No.: US 10,821,379 B2
(45) Date of Patent: Nov. 3, 2020

(54) GAS LIQUID SEPARATOR AND ASSOCIATED METHODS

(71) Applicant: Waters Technologies Corporation, Milford, MA (US)

(72) Inventor: Joshua A. Shreve, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 140 days.

(21) Appl. No.: 15/792,418

(22) Filed: Oct. 24, 2017

(65) Prior Publication Data

US 2018/0111062 A1 Apr. 26, 2018

Related U.S. Application Data

(60) Provisional application No. 62/412,437, filed on Oct. 25, 2016.

(51) Int. Cl.
*B01D 46/46* (2006.01)
*B01D 19/00* (2006.01)
(Continued)

(52) U.S. Cl.
CPC ......... *B01D 19/0063* (2013.01); *B01D 15/24* (2013.01); *B01D 15/40* (2013.01);
(Continued)

(58) Field of Classification Search
CPC .... B01D 19/0063; B01D 15/24; B01D 15/40; B01D 46/0086; B01D 46/0005;
(Continued)

(56) References Cited

U.S. PATENT DOCUMENTS 3,630,002 A 12/1971 Burrus
4,315,822 A * 2/1982 Jaisinghani ........ B01D 17/0208
210/794

(Continued)

FOREIGN PATENT DOCUMENTS

JP 2005281016 A 10/2005
JP 2009150784 A 7/2009
WO 2012/174437 A1 12/2012

OTHER PUBLICATIONS

International Search Report and Written Opinion for International Patent Application No. PCT/IB2017/056600, dated Jan. 12, 2018 and dated Jan. 19, 2018.

*Primary Examiner* — Dung H Bui
(74) *Attorney, Agent, or Firm* — Womble Bond Dickinson (US) LLP; Deborah M. Vernon; Heath T. Misley (57) ABSTRACT

Exemplary embodiments are directed to a gas liquid separator that includes a chamber for receiving a fluid mixture, a fluid mixture inlet, a solvent outlet, and a gas outlet. The gas liquid separator can include a sensor disposed around or within the chamber for sensing at least one of a solvent level or a gas level. The gas liquid separator can include a regulator connected to at least one of the solvent outlet or the gas outlet for regulating at least one of the solvent level or the gas level within the chamber. Exemplary methods of regulating at least one of the solvent level or the gas level within a gas liquid separator of a $CO_2$-based chromatography flow system are also provided.

18 Claims, 8 Drawing Sheets

(51) Int. Cl.
  *G01N 30/32* (2006.01)
  *B01D 15/24* (2006.01)
  *B01D 15/40* (2006.01)
  *G01N 30/80* (2006.01)
  *G01N 1/40* (2006.01)
  *B01D 46/00* (2006.01)
  *F24F 11/30* (2018.01)
  *F24F 3/16* (2006.01)

(52) U.S. Cl.
  CPC ......... *G01N 30/32* (2013.01); *B01D 46/0005* (2013.01); *B01D 46/0068* (2013.01); *B01D 46/0086* (2013.01); *B01D 2253/102* (2013.01); *F24F 3/1603* (2013.01); *F24F 11/30* (2018.01); *G01N 30/80* (2013.01); *G01N 2001/4061* (2013.01)

(58) Field of Classification Search
  CPC ......... B01D 46/0068; B01D 2253/102; G01N 30/32; G01N 2001/4061; G01N 30/80; F24F 11/30; F24F 11/39; F24F 3/1603
  See application file for complete search history.

(56) References Cited

U.S. PATENT DOCUMENTS

| | | | | |
|---|---|---|---|---|
| 4,385,986 A * | 5/1983 | Jaisinghani | B01D 17/0211 | 210/123 |
| 4,476,028 A * | 10/1984 | Harris | B01D 17/0214 | 210/774 |
| 4,766,001 A * | 8/1988 | Mizandjian | B01D 19/0005 | 426/477 |
| 4,988,427 A * | 1/1991 | Wright | B01D 17/02 | 204/661 |
| 5,122,280 A * | 6/1992 | Russell | B01D 17/0214 | 210/745 |
| 5,158,585 A * | 10/1992 | Saho | B01D 46/0009 | 55/338 |
| 5,451,318 A * | 9/1995 | Moorehead | B03D 1/1418 | 209/710 |
| 5,484,521 A * | 1/1996 | Kramer | B01D 17/0217 | 210/86 |
| 6,752,845 B2 * | 6/2004 | Haland | B01D 45/16 | 55/340 |
| 6,981,997 B2 * | 1/2006 | Williams | B01D 19/0005 | 426/475 |
| 2002/0139752 A1 | 10/2002 | Berger et al. | | |
| 2004/0045432 A1 * | 3/2004 | Yamamoto | B01D 53/22 | 95/48 |
| 2005/0236307 A1 * | 10/2005 | Mazurek | B01D 17/0214 | 210/86 |
| 2006/0144241 A1 * | 7/2006 | Fukagawa | B01D 19/0005 | 96/242 |
| 2009/0048396 A1 * | 2/2009 | Waltl | B01D 17/10 | 525/55 |
| 2010/0235002 A1 * | 9/2010 | Dufilho | B01D 33/0315 | 700/275 |
| 2010/0269696 A1 * | 10/2010 | Sarshar | B01D 17/0217 | 95/243 |
| 2011/0094606 A1 * | 4/2011 | Kanomata | B01D 15/40 | 137/487.5 |
| 2011/0155256 A1 * | 6/2011 | DiLorenzo | B01D 19/0042 | 137/14 |
| 2011/0203460 A1 * | 8/2011 | Skofteland | E21B 43/36 | 96/408 |
| 2013/0180404 A1 * | 7/2013 | Fogelman | B01D 19/0057 | 95/266 |
| 2014/0093797 A1 * | 4/2014 | Muetschele | H01M 8/04097 | 429/415 |
| 2016/0008742 A1 * | 1/2016 | Adler | B01D 19/0063 | 96/157 |
| 2016/0265322 A1 * | 9/2016 | Beg | F04F 5/10 | |
| 2017/0038347 A1 * | 2/2017 | Tipler | C25B 9/08 | |
| 2017/0247958 A1 * | 8/2017 | Alfonzo Nunez | E21B 21/063 | |

* cited by examiner

GAS LIQUID SEPARATOR AND ASSOCIATED METHODS

RELATED APPLICATIONS

This application claims priority to U.S. Provisional Patent Application Ser. No. 62/412,437 entitled "Gas Liquid Separator and Associated Methods," filed on Oct. 25, 2016, the content of which is hereby incorporated by reference in its entirety.

TECHNICAL FIELD

The present disclosure relates to gas liquid separators (GLS) and associated methods and, in particular, to gas liquid separators that include a sensor for sensing at least one of a solvent level or a gas level within a chamber of a gas liquid separator and a pressure regulator for regulating a pressure within the chamber.

BACKGROUND

Chromatographic techniques are important tools for the identification and separation of complex samples. The basic principle underlying chromatographic techniques is the separation of a mixture into individual components by transporting the mixture in a moving fluid through a retentive media. The moving fluid is typically referred to as the mobile phase and the retentive media is typically referred to as the stationary phase. The separation of the various constituents of the mixture is based on differential partitioning between the mobile and stationary phases. Differences in components' partition coefficient result in differential retention on the stationary phase, resulting in separation.

Conventionally, the methods of choice for chromatographic separations have been gas chromatography (GC) and liquid chromatography (LC). One major difference between GC and LC is that the mobile phase in GC is a gas, whereas the mobile phase in LC is a liquid. For example, in GC, a supply of inert carrier gas (mobile phase) is continually passed as a stream through a heated column containing porous sorptive media (stationary phase). A sample of the subject mixture is injected into the mobile phase stream and passed through the column, where separation of the mixture is primarily due to the differences in the volatile characteristics of each sample component at the temperature of the column. A detector, positioned at the outlet end of the column, detects each of the separated components as they exit the column. Although GC is typically a sensitive method of analysis, the high temperatures required in GC make this method unsuitable for high molecular weight biopolymers or proteins (e.g., heat can denature them), frequently encountered in biochemistry.

Conversely, LC is a separation technique in which the mobile phase is a liquid and does not require volatilization of the sample. Liquid chromatography that generally utilizes small packing particles and moderately high pressure is referred to as high-performance liquid chromatography (HPLC); whereas liquid chromatography that generally utilizes very small packing particles and high pressure is referred to as ultra-high performance liquid or ultra-high pressure liquid chromatography (UHPLC). In HPLC and UHPLC the sample is forced by a liquid at high pressure (the mobile phase) through a column that is packed with a stationary phase composed of, for example, irregularly or spherically shaped particles, a porous monolithic layer, a porous membrane, etc.

Because LC uses liquid as the mobile phase, LC techniques are capable of analyzing higher molecular weight compounds. For example, LC can be used to prepare large scale batches of purified protein(s). In contrast, GC techniques are typically more sensitive. For example, GC can be used for the separation of single chiral materials, such as to isolate and determine the relative purity of a chiral compound by determining the enantiomeric excess (% ee) or the diastereomeric excess (% de) of a particular chiral compound. As with most chromatographic techniques, the limiting factor in both GC and LC has been the ability to obtain and/or reproduce pure sample separations, each of which are typically dependent on the apparatus, methods, and conditions employed, e.g., flow rate, column size, column packing material, solvent gradient, and the like.

Figure 1:
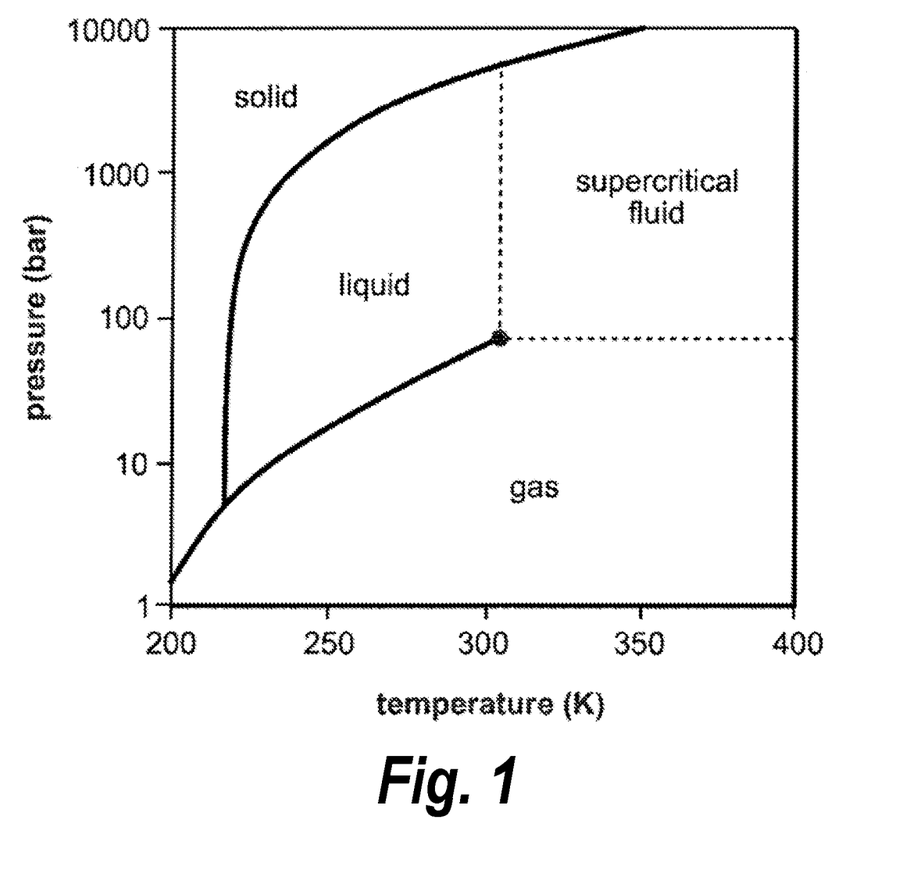
FIG. 1 is an exemplary graph of the physical state of a substance in relation to a temperature and pressure associated with the substance.

Supercritical Fluid Chromatography (SFC) is another chromatographic technique which involves a supercritical or near supercritical fluid as the mobile phase. For every liquid substance there is a temperature above which it can no longer exist as a liquid, no matter how much pressure is applied. Likewise, there is a pressure above which the substance can no longer exist as a gas no matter how much the temperature is raised. These points are called the supercritical temperature and supercritical pressure, and define the boundaries on a phase diagram for a pure substance (FIG. 1). At this point, the liquid and vapor have the same density and the fluid cannot be liquefied by increasing the pressure. Above this point, where no phase change occurs, the substance acts as a supercritical fluid (SF). Thus, SF can be described as a fluid obtained by heating above the critical temperature and compressing above the critical pressure. There is a continuous transition from liquid to SF by increasing temperature at constant pressure or from gas to SF by increasing pressure at constant temperature.

The term SFC, while typically standing for Supercritical Fluid Chromatography, does not require or mean that supercritical conditions are obtained during or maintained throughout the separation. That is, columns do not have to be always operated in the critical region of the mobile phase. For example, in the event that the mobile phase includes a modifier (e.g., $CO_2$ and methanol as a modifier), the mobile phase is often in its subcritical region (e.g., a highly compressed gas or a compressible liquid rather than a supercritical fluid). In fact, as Guiochon et al. note in section 2.3 of their review article entitled "Fundamental challenges and opportunities for preparative supercritical fluid chromatography" Journal of Chromatography A, 1218 (2011) 1037-1114: "It is obvious that SFC has very often been and still is run under subcritical conditions." Thus, the term SFC is not limited to processes requiring supercritical conditions.

In certain embodiments, SFC systems use $CO_2$, thereby permitting SFC processes to be inexpensive, innocuous, eco-friendly, and non-toxic. There is typically no need for the use of volatile solvent(s) (e.g., hexane). Finally, the mobile phase in SFC processes (e.g., $CO_2$ together with any modifier/additive as a SF, highly compressed gas, or compressible liquid) typically have higher diffusion constants and lower viscosities relative to liquid solvents. The low viscosity means that pressure drops across the column for a given flow rate is greatly reduced. The increased diffusivity means longer column length can be used.

Chromatographic processes using a mobile phase consisting at least in part of $CO_2$ is sometimes referred to as $CO_2$-based chromatography. $CO_2$-based chromatography can utilize supercritical or near supercritical $CO_2$ for a mobile phase. $CO_2$-based chromatography does not require the use of SFs. In general, $CO_2$ when used as a constituent of a mobile phase in chromatography is considered to be a compressible fluid, providing a higher diffusion constant and lower viscosity compared to liquid solvents used in LC, HPLC, and UHPLC processes.

Some $CO_2$-based chromatography systems use a gas liquid separator (GLS) to separate the fluid mixture (e.g., a mobile phase combined with a sample) into a solvent (e.g., a liquid) and gas after passing through the column for disposal purposes. In general, gas liquid separators are designed to clean up a gas and do not ensure the integrity of the liquid or solvent of the fluid mixture. Typical gas liquid separators include fixed restrictions, e.g., inlet and outlet ports, that can cause varied flow depending on system flow conditions, such as fluid velocity, pressure, temperature, and the like. For example, gas liquid separators are generally controlled with a manual regulator on one outlet port and a fixed restrictor, e.g., a fixed pipe diameter, on the other outlet port. Due to the fixed restriction, it is possible for the gas liquid separator system to be unbalanced based on a change in system flow conditions, resulting in gas being driven out of the solvent or liquid outlet port with the solvent. It is also possible for solvent to be driven out of the gas outlet port, resulting in a loss of the sample.

Figure 2:
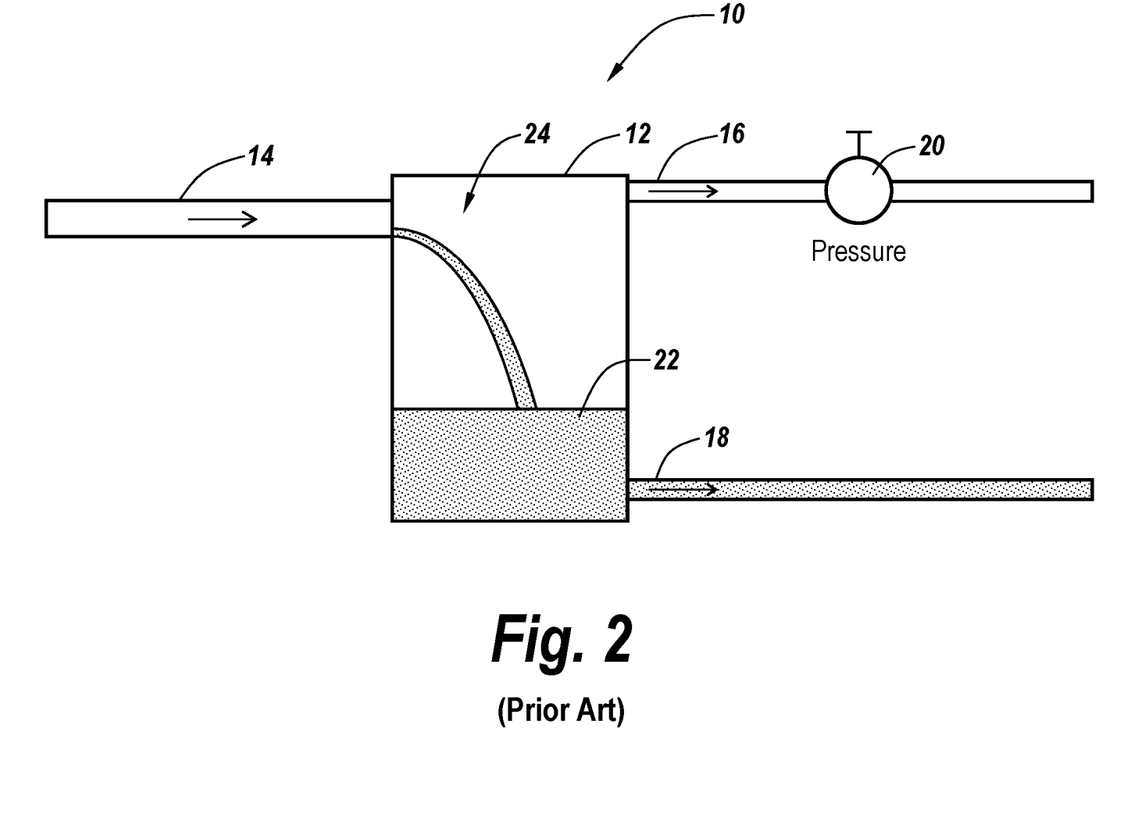
FIG. 2 shows a diagrammatic view of a gas liquid separator of the prior art in a balanced state.
Figure 3:
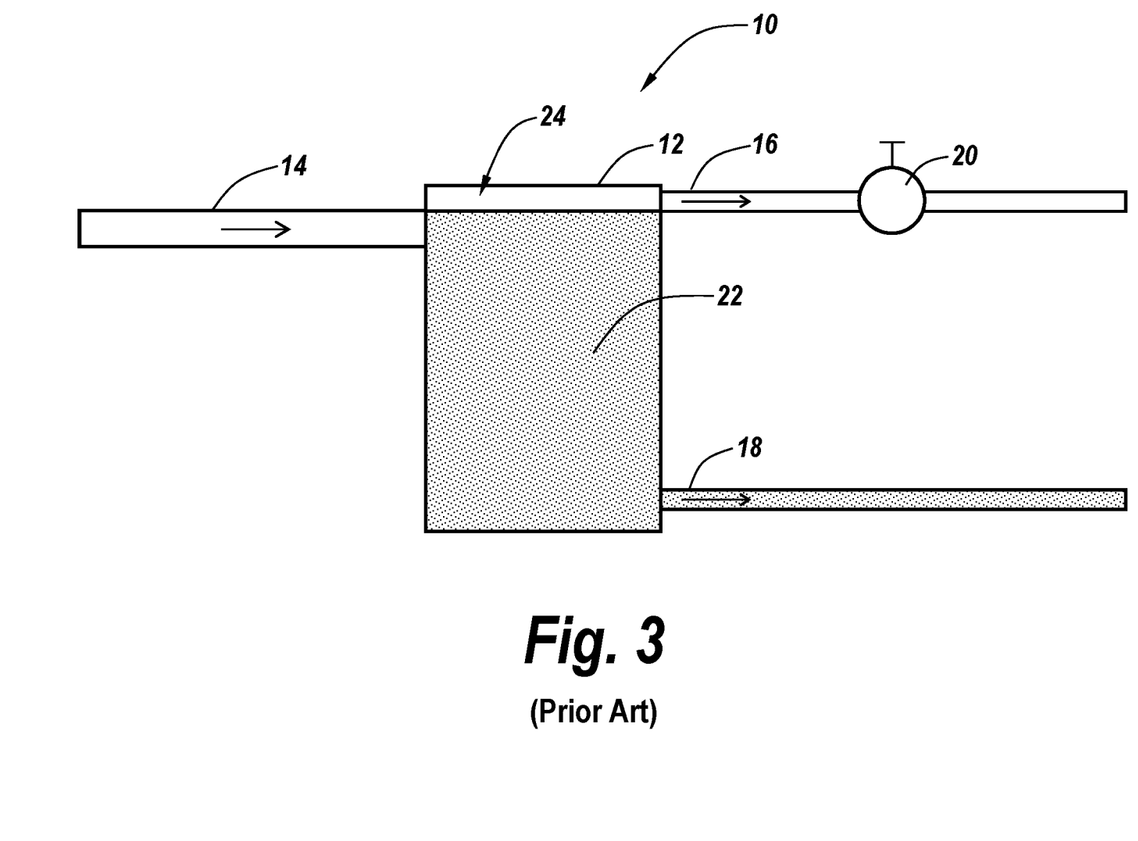
FIG. 3 shows a diagrammatic view of a gas liquid separator of the prior art in an unbalanced state.
Figure 4:
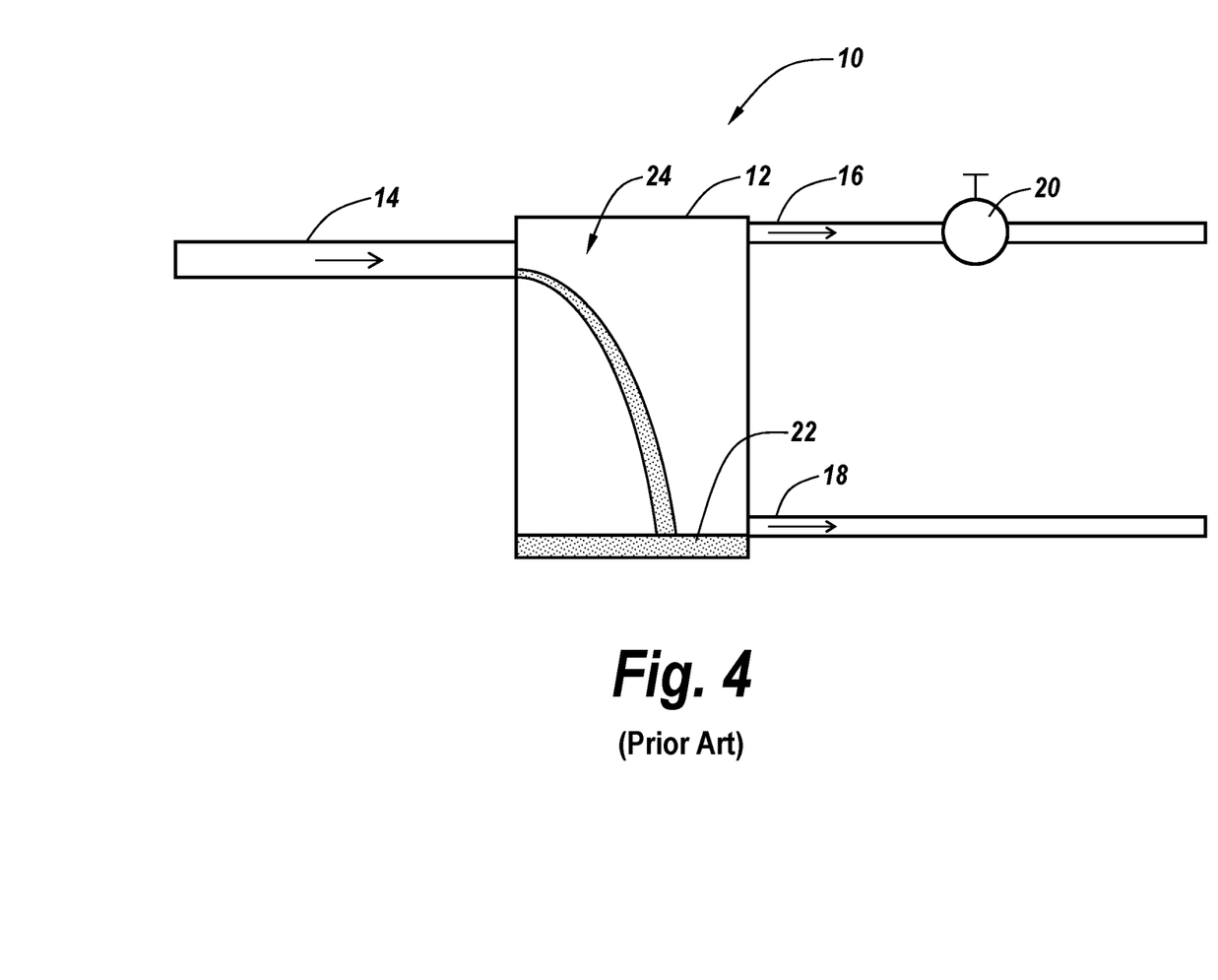
FIG. 4 shows another diagrammatic view of a gas liquid separator of the prior art in an unbalanced state.

FIGS. 2-4 show a gas liquid separator 10 of the prior art in balanced and unbalanced states. The gas liquid separator 10 includes a chamber 12, a fluid mixture inlet 14, a gas outlet 16 and a solvent outlet 18. The fluid mixture inlet 14 and the solvent outlet 18 generally define a fixed restriction and a manual regulator 20, e.g., a manual pressure regulator valve, controls the pressure in the gas outlet 16. Alternatively, the fluid mixture inlet 14 and the gas outlet 16 can define a fixed restriction and the manual regulator 20 can control the pressure in the solvent outlet 18.

FIG. 2 shows the gas liquid separator 10 in a balanced state. In particular, the solvent 22 and the gas 24 within the chamber 12 are balanced relative to each other such that the solvent outlet 18 discharges substantially only solvent 22 and the gas outlet 16 discharges substantially only gas 24, e.g., each of the two phases is discharged from the gas liquid separator 10 through the appropriate line or outlet.

However, due to the fixed restrictions noted above, upon changes in system flow conditions, the gas liquid separator 10 can become unbalanced. For example, FIG. 3 shows the gas liquid separator 10 in an unbalanced state. In particular, the solvent outlet 18 produces a greater amount of back pressure than the gas outlet 16, e.g., a $CO_2$ outlet, which increases the solvent 22 level in the chamber 12 and causes the solvent 22 to flood, or discharge through, the gas outlet 16. At least a portion of the sample and solvent 22 can thereby be lost through the gas outlet 16.

As a further example, FIG. 4 shows the gas liquid separator 10 in an unbalanced state. In particular, the gas outlet 16 produces a greater amount of back pressure than the solvent outlet 18, which decreases the solvent 22 level in the chamber 12 and causes the gas 24 to enter, or discharge through, the solvent outlet 18. The solvent outlet 18 thereby discharges a mixed phase including the solvent 22 and the gas 24, which can cause erratic spraying at a downstream collector (not shown) for the sample. Thus, due to changing system flow conditions, the gas liquid separator 10 can be unbalanced, resulting in inadequate separation of the fluid mixture, a loss of a sample and/or undesirable sample collecting conditions downstream of the gas liquid separator 10.

SUMMARY

Exemplary embodiments of the present technology include gas liquid separators and associated methods that include one or more sensors disposed around or within the chamber for sensing at least one of a solvent level or a gas level within the chamber of the gas liquid separators. Based on the sensed solvent level and/or gas level, a regulator, e.g., a pressure regulator, an on/off valve, or the like, connected to the solvent outlet and/or the gas outlet can be adjusted to regulate at least one of the solvent level or the gas level within the chamber. As a result, the gas liquid separator can remain balanced during varying system flow conditions, which ensures appropriate separation of the fluid mixture.

In accordance with embodiments of the present disclosure, exemplary gas liquid separators are provided that include a chamber, a fluid mixture inlet, a solvent outlet and a gas outlet. The chamber can receive a fluid mixture, e.g., a mixture of $CO_2$ and a solvent. The fluid mixture can be introduced into the chamber for separation into a gas and a liquid solvent. In some embodiments, the separation of the fluid mixture can be a full separation, e.g., substantially 100%. In some embodiments, the separation of the fluid mixture can be a partial separation, e.g., 85% gas and 15% solvent. The fluid mixture inlet provides an inlet for the fluid mixture into the chamber. The solvent outlet can discharge the liquid solvent from the chamber after separation of the liquid solvent from the gas. The gas outlet discharges the gas from the chamber after separation of the gas from the liquid solvent.

The gas liquid separators include one or more sensors for sensing, e.g., a solvent level, a gas level, combinations thereof, and the like, within the chamber. In some embodiments, the one or more sensors can be disposed around or within the chamber. The gas liquid separators can include a regulator connected to at least one of the solvent outlet or the gas outlet for regulating a pressure within the chamber. In some embodiments, the regulator can be a pressure regulator. In some embodiments, the regulator can be an on/off valve. In some embodiments, the sensor can be a liquid level sensor, e.g., ultrasonic, optical, and the like, for sensing the solvent level within the chamber. In some embodiments, the sensor can be disposed on a top surface of the chamber for sensing a depth of the chamber to a surface of the liquid solvent to determine the amount of liquid solvent and/or gas within the chamber. In some embodiments, the sensor can be disposed at or near the solvent outlet for sensing an amount of the liquid solvent and the gas received by the solvent outlet. In some embodiments, a pressure sensor can be disposed at or near the gas outlet for sensing the pressure within the gas outlet. In some embodiments, a liquid level sensor can be connected to at least one of the gas outlet or the solvent outlet for sensing a flow within at least one of the gas outlet or the solvent outlet.

The regulator can be communicatively connected to the sensor. In some embodiments, the pressure regulator can automatically adjust the pressure within at least one of the solvent outlet or the gas outlet (e.g., solvent outlet only, gas outlet only, or both solvent and gas outlets) based on one or more signals received from the sensor to regulate at least one of the solvent level or the gas level within the chamber. In some embodiments, the on/off valve can automatically adjust a flow within at least one of the solvent outlet or the gas outlet (e.g., solvent outlet only, gas outlet only, or both solvent and gas outlets) based on a signal received from the sensor to regulate at least one of the solvent level or the gas level within the chamber. Regulating at least one of the solvent level or the gas level within the chamber with the regulator can maintain a separation and a balance of the solvent and the gas within the chamber. Separation and balance of the solvent and the gas within the chamber can prevent the gas from being discharged from the liquid solvent outlet and the liquid solvent from being discharged from the gas outlet.

In some embodiments, the pressure regulator can be, e.g., a pressure control valve, an on/off valve, combinations thereof, and the like. In some embodiments, the solvent outlet can include a fixed restriction outlet and the regulator can be connected to the gas outlet. In some embodiments, the gas outlet can include a fixed restriction outlet and the regulator can be connected to the solvent outlet. In some embodiments, the gas liquid separator includes a capacitive gas chamber disposed along the gas outlet for introduction of gas into the gas outlet or removal of gas from the gas outlet to dampen a pressure response during regulation of the pressure within the chamber.

In accordance with embodiments of the present disclosure, exemplary methods of regulating at least one of a solvent level or a gas level within a gas liquid separator are provided that include providing a gas liquid separator. The gas liquid separator includes a chamber, a fluid mixture inlet, a solvent outlet and a gas outlet. The gas liquid separator can include at least one sensor disposed around or within the chamber, and a regulator or the like connected to at least one of the solvent outlet or the gas outlet. The methods can include introducing a fluid mixture into the chamber through the fluid mixture inlet for separation, e.g., full separation, partial separation, and the like, of the fluid mixture into a gas and a liquid solvent.

The method can include separating the gas from the liquid solvent, discharging the liquid solvent from the chamber through the solvent outlet, and discharging the gas from the chamber through the gas outlet. The method can include sensing at least one of a solvent level or a gas level with the sensor. Based on one or more signals received by the regulator from the sensor, the method can include adjusting a pressure or a flow within at least one of the solvent outlet or the gas outlet (e.g., solvent outlet only, gas outlet only, or both gas and solvent outlets) with the regulator to regulate at least one of the solvent level or the gas level within the chamber. The method can include communicatively connecting the regulator to the sensor. In some embodiments, the method can include introducing additional gas into the gas outlet from a capacitive gas chamber (or a make-up source) or removing gas from the gas outlet from the capacitive gas chamber disposed along the gas outlet to dampen a pressure response during regulation of at least one of the solvent level or the gas level within the chamber.

In accordance with other embodiments of the present disclosure, exemplary gas liquid separators can be provided that include a chamber, a fluid mixture inlet, a solvent outlet and a gas outlet. The chamber can receive a fluid mixture. The fluid mixture can be introduced into the chamber for separation into a gas and a liquid solvent. The fluid mixture inlet provides an inlet for the fluid mixture into the chamber. The solvent outlet discharges the liquid solvent from the chamber after separation of the liquid solvent from the gas. The gas outlet discharges the gas from the chamber after separation of the gas from the liquid solvent. The gas liquid separator can include a sensor disposed around or within the chamber for sensing at least one of a solvent level or a gas level. The gas liquid separator can include a solvent regulator connected to the fluid mixture inlet for adjusting an amount of the liquid solvent within the fluid mixture prior to introduction of the fluid mixture into the chamber for regulating at least one of the solvent level or the gas level within the chamber.

The above embodiment can include one or more of the following features. The solvent outlet and the gas outlet can include a fixed restriction outlet. The solvent regulator can be connected to a dedicated reservoir of solvent. The dedicated reservoir of solvent can be a source of solvent other than a fluid mixture source (e.g., a make-up solvent).

In accordance with embodiments of the present disclosure, exemplary methods of regulating at least one of a solvent level or a gas level within a gas liquid separator are provided that include providing a gas liquid separator. The gas liquid separator includes a chamber, a fluid mixture inlet, a solvent outlet and a gas outlet. The gas liquid separator can include a sensor disposed around or within the chamber and a solvent regulator connected to the fluid mixture inlet.

The method can include introducing a fluid mixture into the chamber through the fluid mixture inlet for separation, e.g., full separation, partial separation, and the like, of the fluid mixture into a gas and a liquid solvent. The method can include separating the gas from the liquid solvent, discharging the liquid solvent from the chamber through the solvent outlet, and discharging the gas from the chamber through the gas outlet. The method can include sensing at least one of a solvent level or a gas level with the sensor. Based on the signal(s) received by the solvent regulator from the sensor, the method can include adjusting an amount of the liquid solvent within the fluid mixture prior to introduction of the fluid mixture into the chamber with the solvent regulator to regulate at least one of the solvent level or the gas level within the chamber.

The above exemplary embodiments in accordance with the present disclosure provide many advantages. For example, one or more embodiments described herein regulate at least one of the solvent level or the gas level within the chamber of the gas liquid separator. As a result, the gas liquid separators can remain balanced during varying system flow conditions, which ensures appropriate separation of the fluid mixture and capture of the sample.

Other advantages and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed gas liquid separators and associated methods, reference is made to the accompanying figures (which are not necessarily to scale), wherein.

DESCRIPTION OF EXEMPLARY EMBODIMENTS

SFC or $CO_2$-based chromatography systems can be adapted as a hybrid between HPLC and GC apparatuses, where the predominant modification is replacement of either the liquid or gas mobile phase with a supercritical fluid (or near supercritical fluid) mobile phase, such as with $CO_2$. In SFC or in some $CO_2$-based chromatography systems (which utilize SFs), the mobile phase is initially pumped as a liquid and is brought into the supercritical region by heating or pressurizing the mobile phase above its supercritical temperature/pressure prior to entry into a column. As the mobile phase passes through an injection valve, the sample is introduced into the supercritical stream, and the mixture is then transferred into a column. The mixture passes through the column (at supercritical or liquid state) and into the detector.

In general, the mobile phase in SFC or $CO_2$-based chromatography system processes has the ability to act both as a substance carrier (like the mobile phases in GC), and dissolve substances readily (like the solvents used in LC). In addition to generally having lower viscosities and better diffusion profiles similar to those of certain gases, the mobile phase in SFC or $CO_2$-based chromatography system processes also generally has high densities and dissolving capacities similar to those of certain liquids. For example, SFs' high densities (0.2-0.5 $gm/cm^3$) provide for their remarkable ability to dissolve large, non-volatile molecules, e.g., supercritical or near supercritical $CO_2$ readily dissolves n-alkanes, di-n-alkyl phthalates, and polycyclic and aromatic compounds. $CO_2$ under pressures and temperatures used in chromatographic processes also possesses similarly high densities and dissolving capacities. Since the diffusion of solutes in a SFC or $CO_2$-based chromatography system mobile phase is about ten times greater than that in liquids (about three times less than in gases), this results in a decrease in resistance to mass transfer in the column and allows for fast high resolution separation. Also, the solvation strength of the mobile phase in SFC or $CO_2$-based chromatography system processes is directly related to the fluid density. Thus, the solubility of solids can be easily manipulated by making slight changes in temperatures and pressures.

Another important property of the mobile phase in SFC or $CO_2$-based chromatography system processes is that it provides high resolution chromatography at much lower temperatures. For example, an analyte dissolved in $CO_2$ can be recovered by reducing the pressure and allowing the sample to evaporate under ambient laboratory conditions. This property is useful when dealing with thermally unstable analytes, such as high molecular weight biopolymers or proteins.

The combination of one or more mechanical or column changes to an SFC instrument and/or a $CO_2$-based chromatography instrument coupled with the inherent properties of chromatography itself, allows for the separation of both chiral and achiral compounds, and has become increasingly predominant in the field of preparatory separations for drug discovery and development. As is known in the art, a $CO_2$-based chromatography system, an SFC system or a UHPLC system can be pressurized with, e.g., $CO_2$, a solvent, a combination of both, or the like, and can utilize a modifier, e.g., methanol, ethanol, and the like. In addition to including $CO_2$ and optional solvents and/or modifiers, the mobile phase also contains the sample of interest just prior to entering the column. The combination of the mobile phase and the sample of interest creates a fluid mixture.

In general, embodiments of the present disclosure are directed to gas liquid separators that include a sensor disposed around or within the chamber for sensing at least one of a solvent level or a gas level, and a regulator (e.g., a pressure regulator, an on/off valve, or the like) for adjusting a pressure or flow to regulate at least one of the solvent level or the gas level within the chamber of the gas liquid separators.

In accordance with embodiments of the present disclosure, exemplary gas liquid separators (GLS) are provided that include a chamber, a fluid mixture inlet, a solvent outlet and a gas outlet. The chamber can receive a fluid mixture, e.g., a mixture of $CO_2$ and a solvent. The fluid mixture can be introduced into the chamber for separation into a gas and a liquid solvent. In some embodiments, the separation of the fluid mixture can be a full separation, e.g., substantially 100%. In some embodiments, the separation of the fluid mixture can be a partial separation, e.g., 85% gas and 15% solvent, or the like. The fluid mixture inlet provides an inlet for the fluid mixture into the chamber. The solvent outlet can discharge the solvent from the chamber after separation of the solvent from the gas. The gas outlet discharges the gas from the chamber after separation of the gas from the solvent. The gas liquid separator can include one or more sensors disposed around or within the chamber for sensing, e.g., a solvent level, a gas level, combinations thereof, and the like, within the chamber. The gas liquid separators can include a regulator (e.g., a pressure regulator, an on/off valve, or the like) connected to at least one of the solvent outlet or the gas outlet for regulating at least one of the solvent level or the gas level within the chamber.

Figure 5:
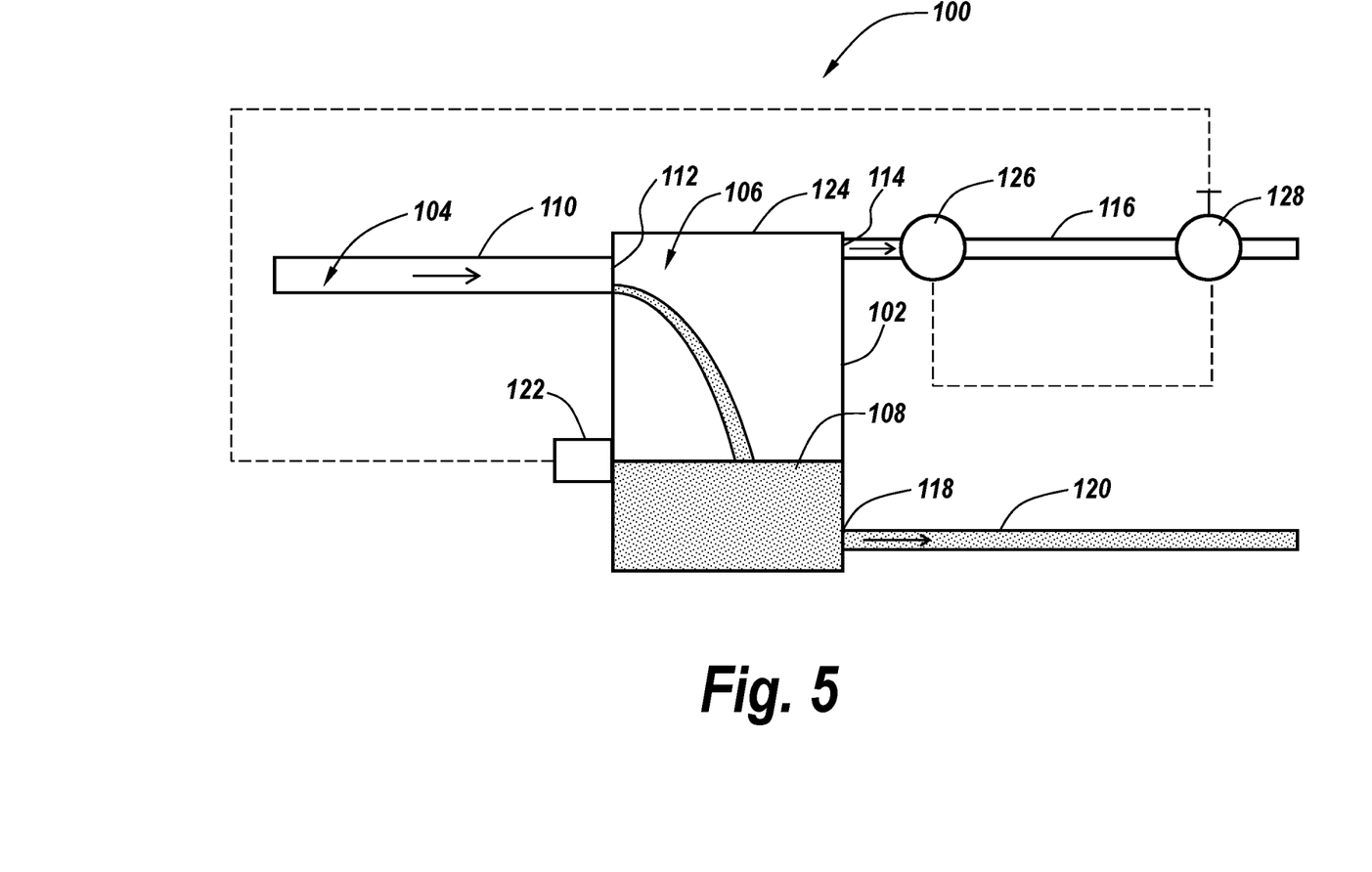
FIG. 5 shows a diagrammatic, side view of an exemplary gas liquid separator including a regulator connected to a gas outlet and a sensor.

FIG. 5 shows a diagrammatic, side view of an exemplary gas liquid separator 100 of a flow system, e.g., a SFC and/or $CO_2$-based chromatography system. The gas liquid separator 100 includes a chamber 102 for receiving a fluid mixture 104. It should be understood that the configuration of the chamber 102 is provided for illustrative purposes and that the chamber 102 can be configured and dimensioned in a variety of sizes, geometries, or both. The fluid mixture 104 can include a solvent and a modifier or gas. In particular, the fluid mixture 104 can be introduced into the chamber 102 to separate the fluid mixture 104 into a gas 106 and a solvent 108.

The fluid mixture 104 can be introduced into the chamber 102 through piping 110 leading to a fluid mixture inlet 112. In some embodiments, the gas liquid separator 100 can be, e.g., an impinging separator, a cyclone separator, and the like, including separator elements for separating the fluid mixture 102 into the gas 106 and solvent 108. Upon separation into the gas 106 and solvent 108, the gas 106 can be discharged from the chamber 102 through a gas outlet 114, e.g., a $CO_2$ outlet, leading to piping 116 and the solvent 108 can be discharged from the chamber 102 through a solvent outlet 118, e.g., a solvent/sample outlet, leading to piping 120.

The gas liquid separator 100 can include one or more sensors 122, e.g., ultrasonic, optical, liquid level, combinations thereof, or the like, disposed around or within the chamber for sensing, e.g., a solvent 108 level, a gas 106 level, combinations thereof, and the like. FIG. 5 shows the sensor 122 positioned on an outer and side surface of the chamber 102. However, in some embodiments, one or more sensors 122 can be positioned, e.g., within the chamber 102, on a top surface 124 of the chamber 102, combinations thereof, and the like.

In some embodiments, the sensor 122 can be a liquid level sensor for sensing the solvent 108 level within the chamber 102. For example, the sensor 122 can detect the point to which the solvent 108 has filled, or partially filled, the chamber 102. In some embodiments, the sensor 122 can be positioned on the top surface 124 of the chamber 102 and can sense the depth of the chamber 102 up to the surface of the solvent 108. For example, the sensor 122 can measure the distance from the top surface 124 of the chamber 102 to a top surface of the solvent 108 within the chamber 102 to determine, e.g., the amount of solvent 108 in the chamber 102, the amount gas 106 in the chamber, combinations thereof, and the like.

In some embodiments, as will be discussed in greater detail below, one or more sensors 122 can be positioned at or near the gas outlet 114 and/or the solvent outlet 118. For example, the sensors 122 can detect the phase of the fluid, e.g., solvent 108, gas 106, or a mixture of the solvent 108 and gas 106, received by the gas outlet 114 and/or the solvent outlet 118. As a further example, the sensors 122 can determine whether the solvent outlet 118 is receiving a phase having only solvent 108 therethrough or a combination of solvent 108 and gas 106.

By measuring the phase of the fluid in the chamber 102, the amount of the solvent 108 and/or the gas 106 in the solvent outlet 118, or both, a correct or proper separation of the solvent 108 and gas 106 can be maintained within the chamber 102. In some embodiments, the correct or proper separation of the solvent 108 and the gas 106 can be maintained within the chamber 102 by adjusting the pressure within the chamber 102 to regulate at least one of the solvent level or the gas level within the chamber 102 with a pressure regulator. In some embodiments, the correct or proper separation of the solvent 108 and the gas 106 can be maintained within the chamber 102 by adjusting the flow within the gas outlet 114 and/or the solvent outlet 118 to regulate at least one of the solvent level or the gas level within the chamber 102 with an on/off valve. In particular, the sensor 122 can be used in combination with a pressure regulator, a flow regulator, or both, to maintain the liquid level within the chamber 102 and the integrity of the gas and solvent outlets 114, 118 by regulating the pressure within the chamber 102, the flow within the gas outlet 114 and/or the solvent outlet 118, or both.

In the embodiment shown in FIG. 5, the gas liquid separator 100 can include a fixed restriction along the piping 120 for the solvent outlet 118, and a sensor 126 (e.g., a pressure sensor, a liquid level sensor, or the like), and a regulator 128, e.g., a pressure control valve, an on/off valve, and the like, along the piping 116 for the gas outlet 114. The dimensions of the fixed restriction along the piping 120 can be selected based on the desired flow rate of the solvent 108. In some embodiments, the fixed restriction along the piping 120 has a dimensional range of about 0.002 to 0.06 inches (diameter/cross-sectional dimension) by about 6 inches to 6 feet (length). In some embodiments, the fixed restriction of the piping 120 can be interchangeable to vary the flow rate of the solvent 108. In some embodiments, rather than a fixed restriction, e.g., a pipe defining a fixed diameter, the piping 120 can include a static pressure regulator. The sensor 126 can detect the pressure, the flow, or both, of the gas 106 within the piping 116 and the regulator 128 can regulate the pressure, the flow, or both, within the piping 116. In some embodiments, the sensor 126 can also detect the percentage of gas 106 and solvent 108 passing through the gas outlet 114. By using the regulator 128 on the gas piping 116, the internal volume of the regulator 128 can affect the sample by restricting or increasing the flow passage through the regulator 128.

By modifying or regulating the pressure, the flow, or both, at the gas outlet 114 with the regulator 128, the flow split can be balanced within the chamber 102 to separate the gas 106 and solvent 108 appropriately, even if one or more system flow conditions are varied. As illustrated by the dashed lines in FIG. 5, the sensor 126 and/or the sensor 122 can be communicatively linked, e.g., wired, wirelessly, and the like, to the regulator 128. The sensor 122, the sensor 126, or both, can send signals to the regulator 128 indicating the level of solvent 108 within the chamber 102 and the pressure, the flow, or both, within the piping 116 of the gas outlet 114, respectively. In some embodiments, the sensor 126 can send signals to the regulator 128 indicating the percentage of solvent 108 and gas 106 passing through the gas outlet 114. Based on the signals received, the regulator 128 can regulate the pressure, the flow, or both, within the piping 116 of the gas outlet 114 and, thereby, the pressure, the solvent level, the gas level, or combinations thereof, within the chamber 102 to maintain the desired separation between the gas 106 and solvent 108.

For example, the regulator 128 can allow the compliance of the $CO_2$ to increase in the piping 116 and can be further used to reduce the pressure, the flow, or both, within the piping 116. As a further example, if the pressure, the flow, or both, within the piping 116 is detected as increasingly high and/or the solvent 108 level in the chamber 102 is detected as substantially low, the regulator 128 can automatically reduce the pressure, the flow, or both, in the piping 116 to allow the separation between the gas 106 and solvent 108 to stabilize. In particular, by reducing the pressure, the flow, or both, within the piping 116, the pressure from the gas 106 within the chamber 102 can be reduced, thereby allowing the level of the solvent 108 in the chamber 102 to increase. Thus, passage of gas 106 through the solvent outlet 118 can be prevented. As yet a further example, if the pressure, the flow, or both, within the piping 116 is detected as substantially low, the solvent 108 level in the chamber 102 is detected as substantially high, a percentage of solvent 108 is detected as passing through the gas outlet 114, or combinations thereof, the regulator 128 can automatically increase the pressure, the flow, or both, in the piping 116 to allow the separation between the gas 106 and solvent 108 to stabilize. In particular, by increasing the pressure within the piping 116, the pressure from the gas 106 within the chamber 102 can be increased, thereby forcing the level of the solvent 108 in the chamber 102 to decrease. Thus, passage of solvent 108 through the gas outlet 114 can be prevented. A controller (not shown) can be utilized to actively regulate the regulator 128 based upon information measured and communicated by sensors 122 and 126. Any type of controller (e.g., continuous controller, such as a PID controller, on/off controller, etc.) can be used to regulate one or both of the pressure and flow of the outlets. In some embodiments, a PID controller is preferred for constantly adjusting the pressure in system 100. In certain embodiments, an on/off style controller can be used to regulate the pressure in the gas chamber.

Figure 6:
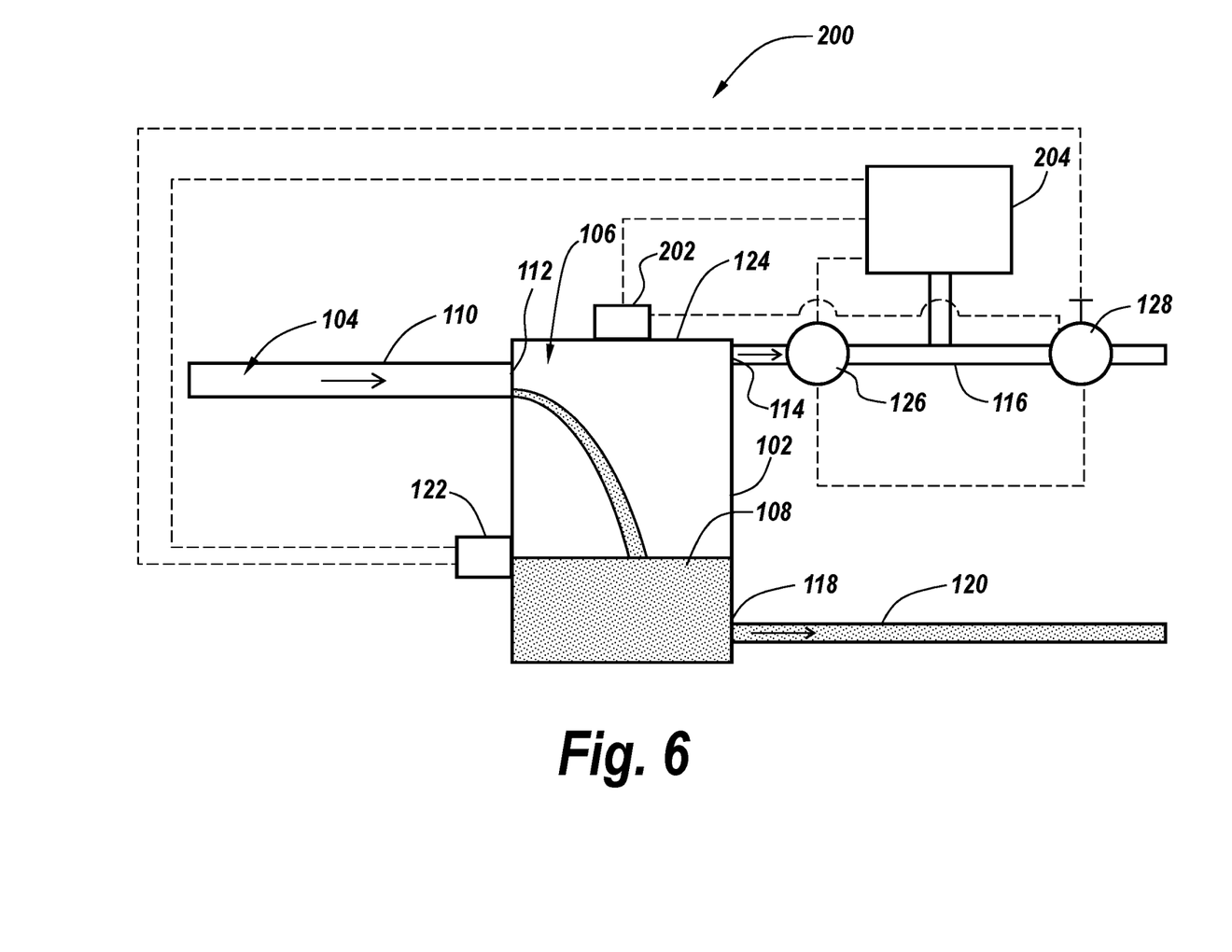
FIG. 6 shows a diagrammatic, side view of an exemplary gas liquid separator including a regulator and a capacitive chamber connected to a gas outlet, and a sensor.

FIG. 6 shows a diagrammatic, side view of an exemplary gas liquid separator 200 which can be substantially similar in structure and function to the gas liquid separator 100, except for the distinctions noted herein. Therefore, like components are marked with like reference numbers.

The gas liquid separator 200 can include a sensor 122, e.g., an optical level sensor, disposed on a side surface of the chamber 102 to detect the level of solvent 108 within the chamber 102, and a sensor 202, e.g., an ultrasonic level sensor, disposed on the top surface 124 of the chamber 102 to detect the level of solvent 108 within the chamber 102. In some embodiments, only one sensor, such as sensor 122 or sensor 202, can be used. An accurate measurement of the amount of solvent 108 within the chamber 102 can thereby be detected to determine whether the pressure within the chamber 102 should be varied to prevent flooding of the outlet ports.

The gas liquid separator 200 can further include a capacitive gas chamber 204 disposed along the piping 116 of the gas outlet 114. The capacitive gas chamber 204 can introduce gas, e.g., $CO_2$, into the piping 116 of the gas outlet 114 or remove gas from the piping 116 to dampen a pressure response during regulation of the pressure (e.g., at least one of the solvent level or the gas level) within the chamber 102. The capacitive gas chamber 204 can slow down the pressure response during regulation of the pressure within the chamber 102, thereby dampening the pressure response by reducing the fluctuations in the pressure typically incurred from an on/off valve. In particular, the capacitive gas chamber 204 can provide a finer adjustment of the pressure within the piping 116. For example, if the pressure, the flow, or both, within the piping 116 is being increased by the regulator 128, the capacitive gas chamber 204 can gradually introduce gas into the piping 116 to allow easier regulation of the pressure, the flow, or both, within the piping 116 with the regulator 128. As a further example, if the pressure, the flow, or both, within the piping 116 is being decreased by the regulator 128, the capacitive gas chamber 204 can gradually remove gas from the piping 116 to allow easier regulation of the pressure, the flow, or both, within the piping 116 with the regulator 128. The capacitive gas chamber 204 can thereby reduce the rate of change of pressure with respect to the flow in the piping 116 as the capacitive gas chamber 204 adds volume. Thus, additional flow is required to change the pressure within the piping 116. This relationship can be represented by Equation 1 below:

$$\Delta Pressure = Flow/Compressible\ Volume \quad (1)$$

Figure 7:
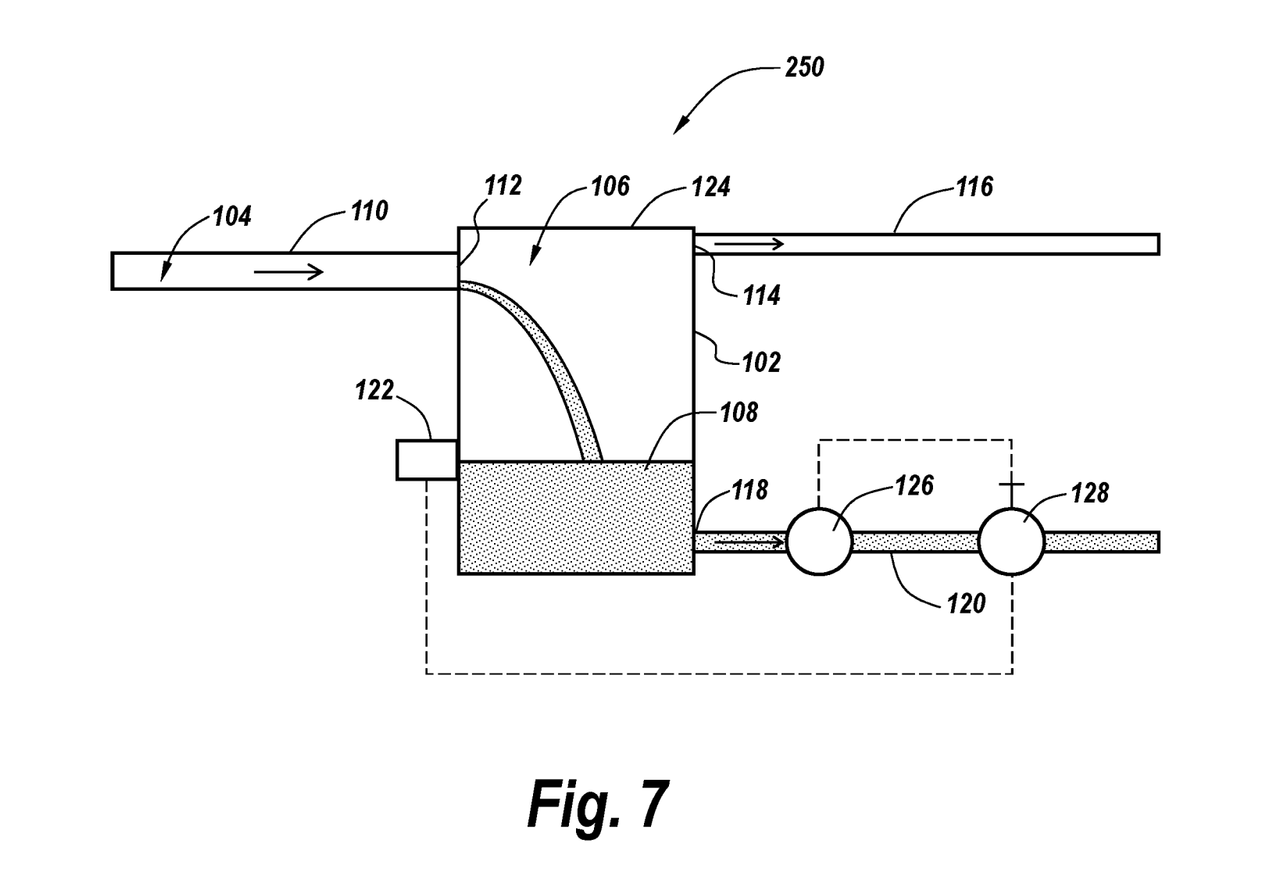
FIG. 7 shows a diagrammatic, side view of an exemplary gas liquid separator including a regulator connected to a solvent outlet and a sensor.

FIG. 7 shows a diagrammatic, side view of a gas liquid separator 250 which can be substantially similar in structure and function to the gas liquid separators 100, 200 discussed above, except for the distinctions noted herein. Therefore, like components are marked with like reference numbers.

In particular, rather than a fixed restriction on the solvent outlet 118, the gas liquid separator 250 can include a fixed restriction, e.g., a static or fixed pressure regulator, a fixed pipe size, and the like, on the piping 116 for the gas outlet 114. The fixed restriction can be selected based on the desired flow rate of the gas 106 and can be interchangeable to vary the gas 106 flow rate. The piping 120 of the solvent outlet 118 can include a sensor 126 (e.g., a pressure sensor, a liquid level sensor, or the like) and a regulator 128 (e.g., a pressure regulator, an on/off valve, or the like). The sensor 126 can detect the pressure, the flow, or both, within the piping 120 and the regulator 128 can regulate the pressure, the flow, or both, within the piping 120 based on signals received from the sensor 126, the sensor 122, or both. In some embodiments, the sensor 126 can detect the percentage of solvent 108 and gas 106 passing through the solvent outlet 118. As discussed above, the sensor 122 can detect the level of solvent 108 within the chamber 102.

As an example, if the pressure, the flow, or both, within the piping 120 is detected as increasingly high and/or the solvent 108 level in the chamber 102 is detected as substantially high, the regulator 128 can automatically decrease the pressure, the flow, or both, in the piping 120 to allow the separation between the gas 106 and solvent 108 to stabilize. In particular, by decreasing the pressure, the flow, or both, within the piping 120, the pressure from the solvent 108 within the chamber 102 can be decreased, thereby allowing the level of the solvent 108 in the chamber 102 to decrease and the level of the gas 106 to increase. Thus, passage of solvent 108 through the gas outlet 114 can be prevented. As a further example, if the pressure, the flow, or both, within the piping 120 is detected as substantially low, the solvent 108 level in the chamber 102 is detected as substantially low, a percentage of gas 106 is detected in the solvent outlet 118, or combinations thereof, the regulator 128 can automatically increase the pressure, the flow, or both, in the piping 120 to allow the separation between the gas 106 and solvent 108 to stabilize. In particular, by increasing the pressure, the flow, or both, within the piping 120, the pressure from the solvent 108 within the chamber 102 can be increased, thereby forcing increasing the level of the solvent 108 in the chamber 102 and decreasing the amount of gas 106 in the chamber 102. Thus, passage of gas 106 through the solvent outlet 118 can be prevented. Although illustrated as including a fixed restriction on at least one of the gas outlet 114 or the solvent outlet 118, in some embodiments, both the piping 116, 120 for the gas outlet 114 and the solvent outlet 118, respectively, can include the sensor(s) and regulator(s) discussed herein. In some embodiments, a continuous controller (e.g., a PID controller) is used in connection with the regulators and sensors to provide active regulation of the device.

Figure 8:
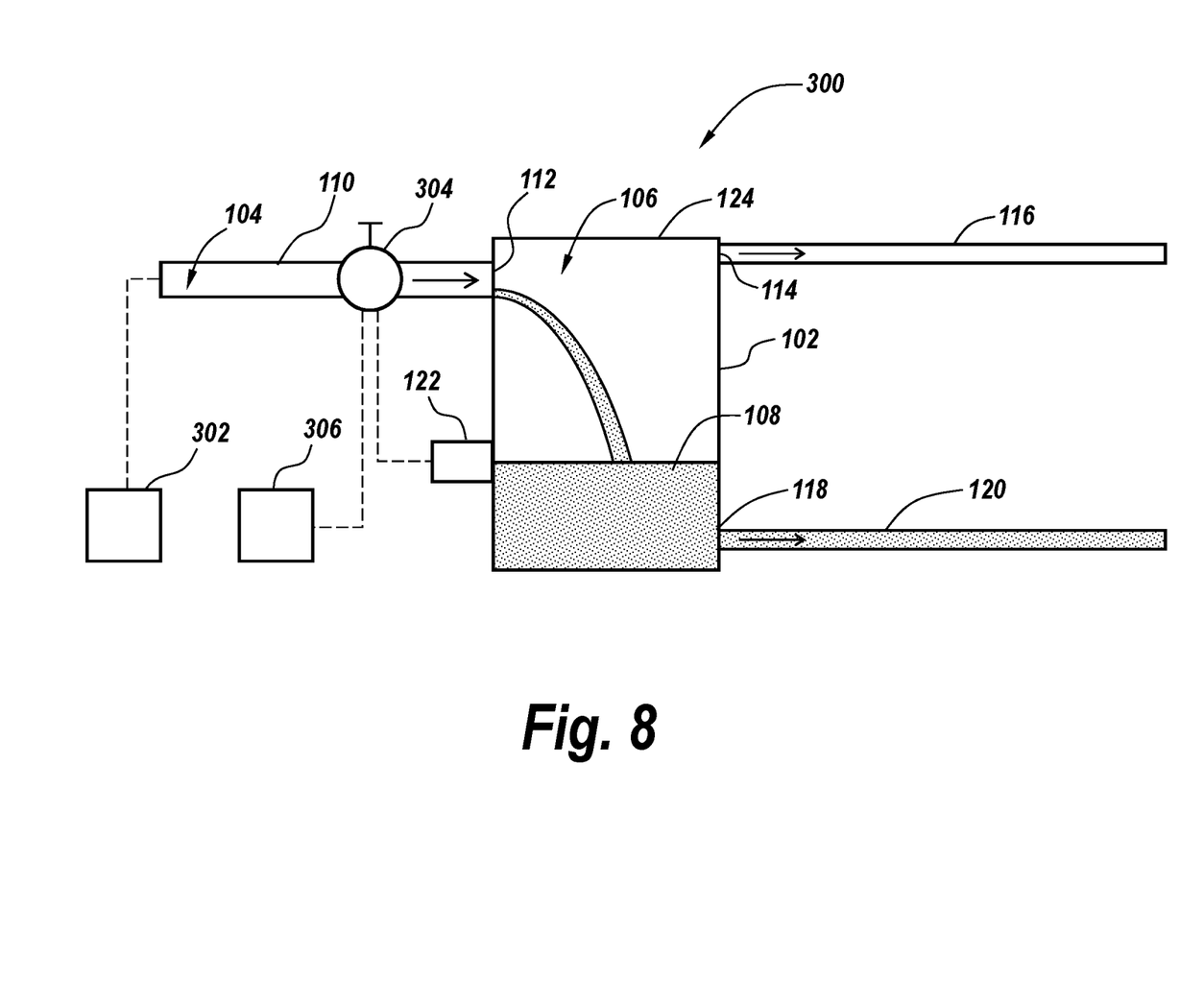
FIG. 8 shows a diagrammatic, side view of an exemplary gas liquid separator including a regulator connected to a fluid mixture inlet.

FIG. 8 shows a diagrammatic, side view of a gas liquid separator 300 which can be substantially similar in structure and function to the gas liquid separators 100, 200, 250 discussed above, except for the distinctions noted herein. Therefore, like components are marked with like reference numbers.

In particular, the gas liquid separator 300 can include fixed restrictions for the piping 116, 120 of both the gas and solvent outlets 114, 118. Similar to the gas liquid separators discussed above, the fluid mixture 104 can be introduced into the chamber 102 from a fluid mixture source 302 through the piping 110. The gas liquid separator 300 can include a valve 304 along the piping 110 upstream of the fluid mixture inlet 112 fluidly connected to a reservoir 306 dedicated to a source of solvent. In some embodiments, the reservoir 306 is a solvent bottle having about 1 liter to 5 gallon capacity. The sensor 122 can detect the level of solvent 108 within the chamber 102 and/or whether a percentage of gas 106 is passing through the solvent outlet 118, and can be communicatively linked to the valve 304. Based on signals received from the sensor 122, the valve 304 can add solvent to the fluid mixture 104 to maintain a balance of the solvent 108 and gas 106 within the chamber 102.

For example, if the sensor 122 detects that the level of solvent 108 is substantially low in the chamber 102, gas 106 has been detected within the solvent outlet 118, or both, the pressure regulator 304 can automatically start or increase a flow of solvent from the reservoir 306 into the piping 110 to ensure the proper amount of solvent 108 and gas 106 within the chamber 102. Passage of gas 106 through the solvent outlet 118 can thereby be prevented. However, it should be noted that the addition of solvent to the fluid mixture 104 increases the amount of solvent 108 to the sample which needs to be handled by a user downstream of the gas liquid separator 300.

The exemplary gas liquid separators discussed herein advantageously regulate the pressure within the chamber to maintain the appropriate separation between the solvent and gas in varying system flow conditions. Systems in accordance with the present technology regulate such that the fluid level stays substantially constant so that the fluid cannot reach the gas outlet and the gas cannot reach the fluid outlet, even under fluctuating or varying flow conditions. The gas liquid separators can therefore operate efficiently and effectively over a wide range of system flow conditions and the integrity of the phase separation can be monitored. That is, by utilizing systems in accordance with the present technology, solvent loses due to aerosolization or the formation of microdroplets can be kept to a minimum. In addition, if the percentage of solvent and gas within the fluid mixture entering the gas liquid separator is unknown, the sensor(s) and regulator(s) can adjust the pressure within the chamber of the gas liquid separator to maintain separation of the solvent and gas, and to ensure a proper flow rate of the solvent out of the gas liquid separator. Adjustment of the system to achieve regulation, in some embodiments, can occur at a rate of between 1 to 50 Hz, for a system that has a flow rate of between 10 mL/min to 350 mL/min and up to about 50% cosolvent. As a result, flooding of the gas outlet with solvent and/or the solvent outlet with gas can be prevented.

The gas liquid separators can also allow for operation at a lower operating pressure. For example, the gas liquid separators of the present disclosure can operate at less than approximately 1,000, 900, 800, 700, 600, 500, 400, 300, 200, 150, or 100 psi. Operation at such low pressures can reduce the cost of regulating the flow system as compared to typical operation at 15,000 psi. The gas liquid separator can therefore operate at a low enough pressure for the gas, e.g., $CO_2$, to remain in the gaseous phase. The lower pressure allows for a lower liquid/gas solubility, thereby permitting more effective separation of the phases. The automatic adjustment of pressure within the chamber with the self-regulating gas liquid separator further removes the inaccuracies involved with manual user adjustment of pressure, the flow, or both, along the gas and/or solvent outlets, e.g., operator error. Although illustrated as different embodiments, it should be understood that the features or components of the exemplary gas liquid separators discussed herein can be combined and/or interchanged to regulate the pressure, the solvent level, the gas level, or combinations thereof, within the chamber in one or more ways.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A gas liquid separator, comprising:
   a chamber for receiving a fluid mixture, the fluid mixture being introduced into the chamber for separation into a gas and a liquid solvent;
   a fluid mixture inlet providing an inlet for the fluid mixture into the chamber;
   a solvent outlet for discharging the liquid solvent from the chamber after separation of the liquid solvent from the gas;
   a gas outlet for discharging the gas from the chamber after separation of the gas from the liquid solvent;
   a gas level sensor for sensing a gas level in the chamber;
   a pressure sensor located downstream of the gas outlet to detect a pressure within a piping for the gas outlet; and
   a regulator located downstream of the pressure sensor and connected to the gas outlet for regulating the gas level within the chamber in response to signals received from the gas level sensor and the pressure sensor.

2. The gas liquid separator of claim 1, wherein the fluid mixture comprises $CO_2$ and the liquid solvent.

3. The gas liquid separator of claim 1, further comprising a liquid level sensor for sensing a solvent level within the chamber.

4. The gas liquid separator of claim 3, wherein the liquid level sensor is at least one of an ultrasonic sensor or an optical sensor.

5. The gas liquid separator of claim 3, wherein the liquid level sensor is disposed on a top surface of the chamber for sensing a depth of the chamber to a surface of the liquid solvent.

6. The gas liquid separator of claim 3, wherein the liquid level sensor is disposed at or near the solvent outlet for sensing an amount of the liquid solvent and the gas received by the solvent outlet.

7. The gas liquid separator of claim 1, wherein the regulator is at least one of a pressure regulator of an on/off valve.

8. The gas liquid separator of claim 7, wherein at least one of the pressure regulator or the on/off valve is communicatively connected to the gas level sensor.

9. The gas liquid separator of claim 8, wherein the pressure regulator automatically adjusts the pressure within the gas outlet based on a signal received from the gas level sensor to regulate the gas level within the chamber.

10. The gas liquid separator of claim 8, wherein the on/off valve automatically adjusts within the gas outlet based on a signal received from the gas level sensor to regulate the gas level within the chamber.

11. The gas liquid separator of claim 7, wherein the pressure regulator is a pressure control valve.

12. The gas liquid separator of claim 7, wherein the pressure regulator is an on/off valve.

13. The gas liquid separator of claim 1, wherein regulating the gas level within the chamber with the regulator maintains a separation and a balance of the liquid solvent and the gas within the chamber.

14. The gas liquid separator of claim 13, wherein the separation and the balance of the liquid solvent and the gas within the chamber prevents the gas from being discharged from the solvent outlet and the liquid solvent from being discharged from the gas outlet.

15. The gas liquid separator of claim 1, wherein the solvent outlet comprises a fixed restriction outlet and the regulator is connected to the gas outlet.

16. The gas liquid separator of claim 1, comprising a capacitive gas chamber disposed along the gas outlet for introduction of gas into the gas outlet or removal of gas from the gas outlet to dampen a pressure response during regulation of at least one of the solvent level or the gas level within the chamber.

17. The gas liquid separator of claim 1, comprising a pressure sensor connected to the gas outlet for sensing a pressure within the gas outlet.

18. The gas liquid separator of claim 1, comprising a liquid level sensor connected to at least one of the gas outlet or the solvent outlet for sensing a flow within at least one of the gas outlet or the solvent outlet.

\* \* \* \* \*